May 4, 1943. E. J. McFARLAND 2,318,245
DRIVING AND STEERING MECHANISM FOR AUTOMOBILES
Filed Sept. 24, 1940 4 Sheets-Sheet 4
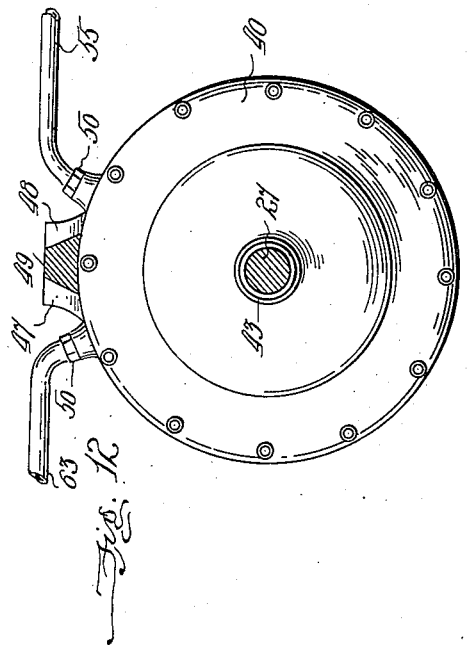
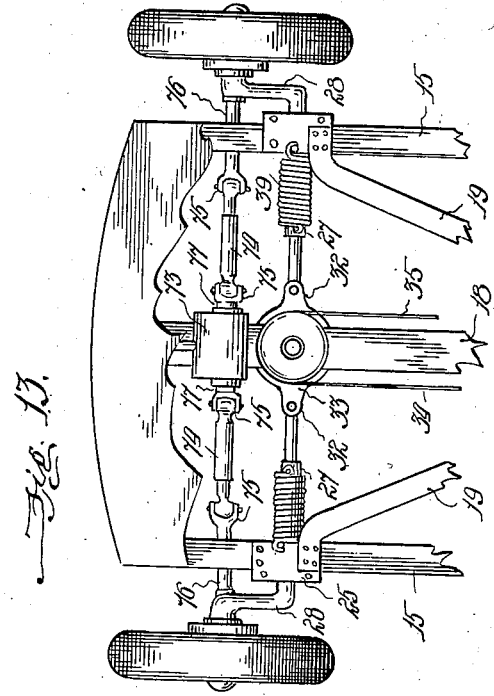
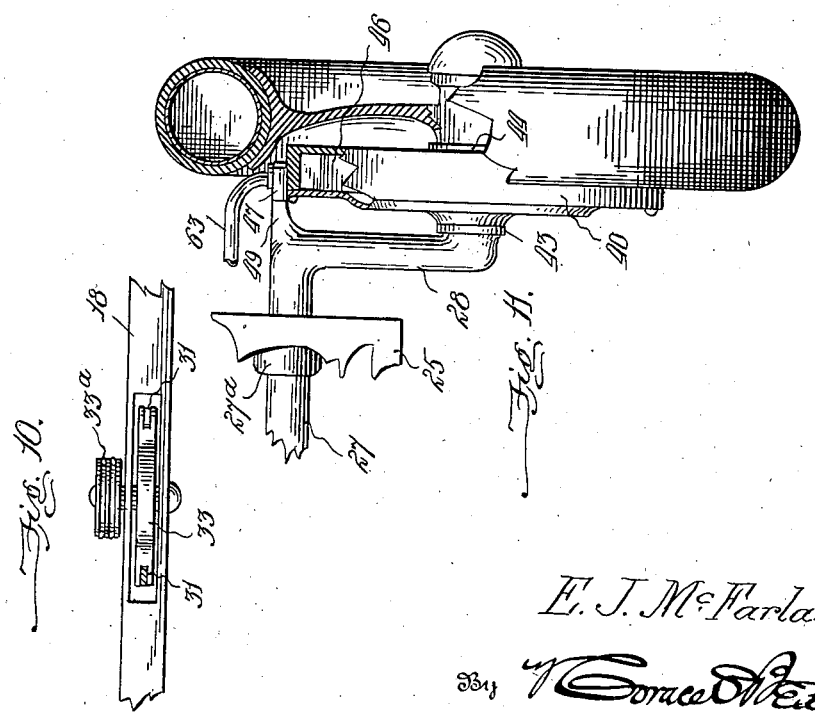
Inventor
E. J. McFarland.

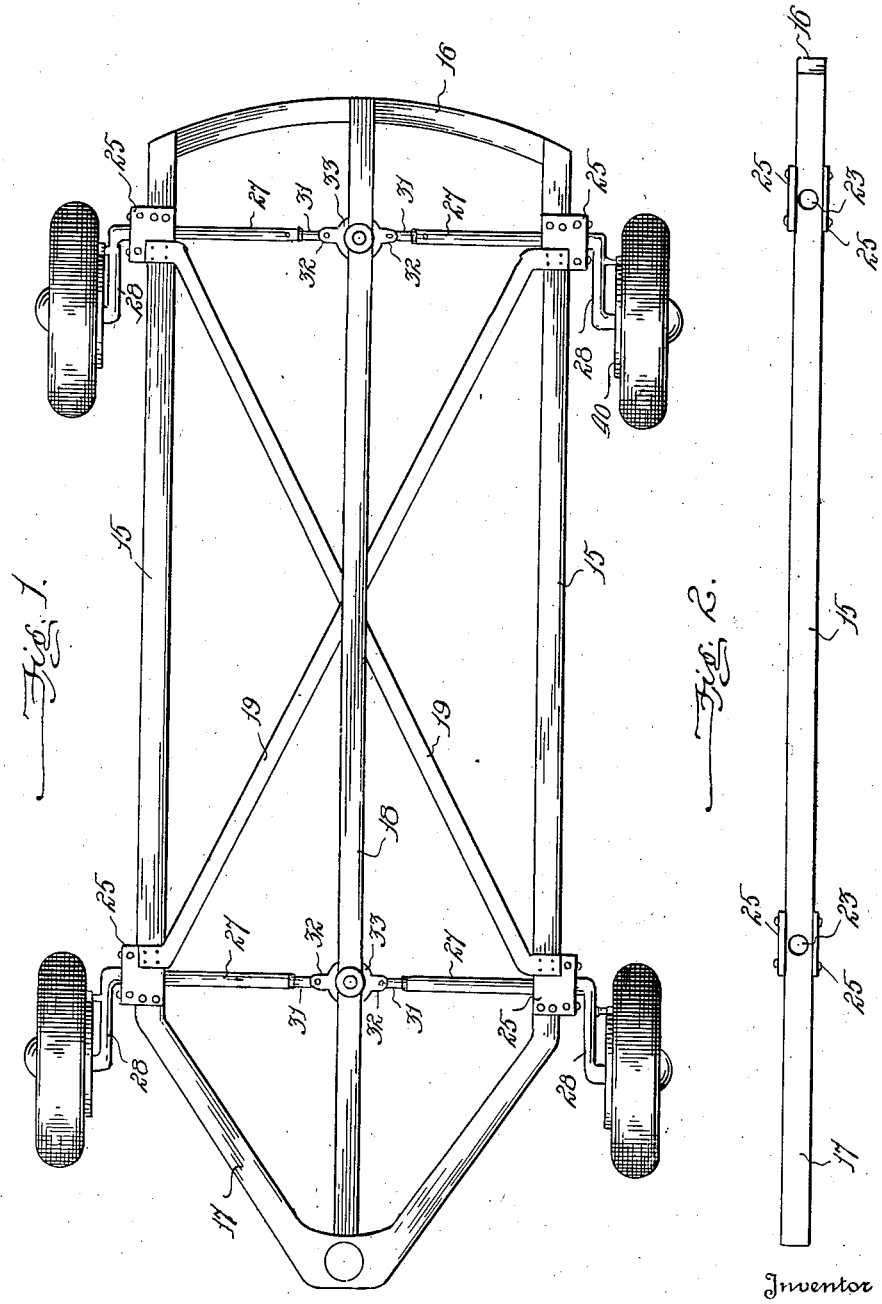

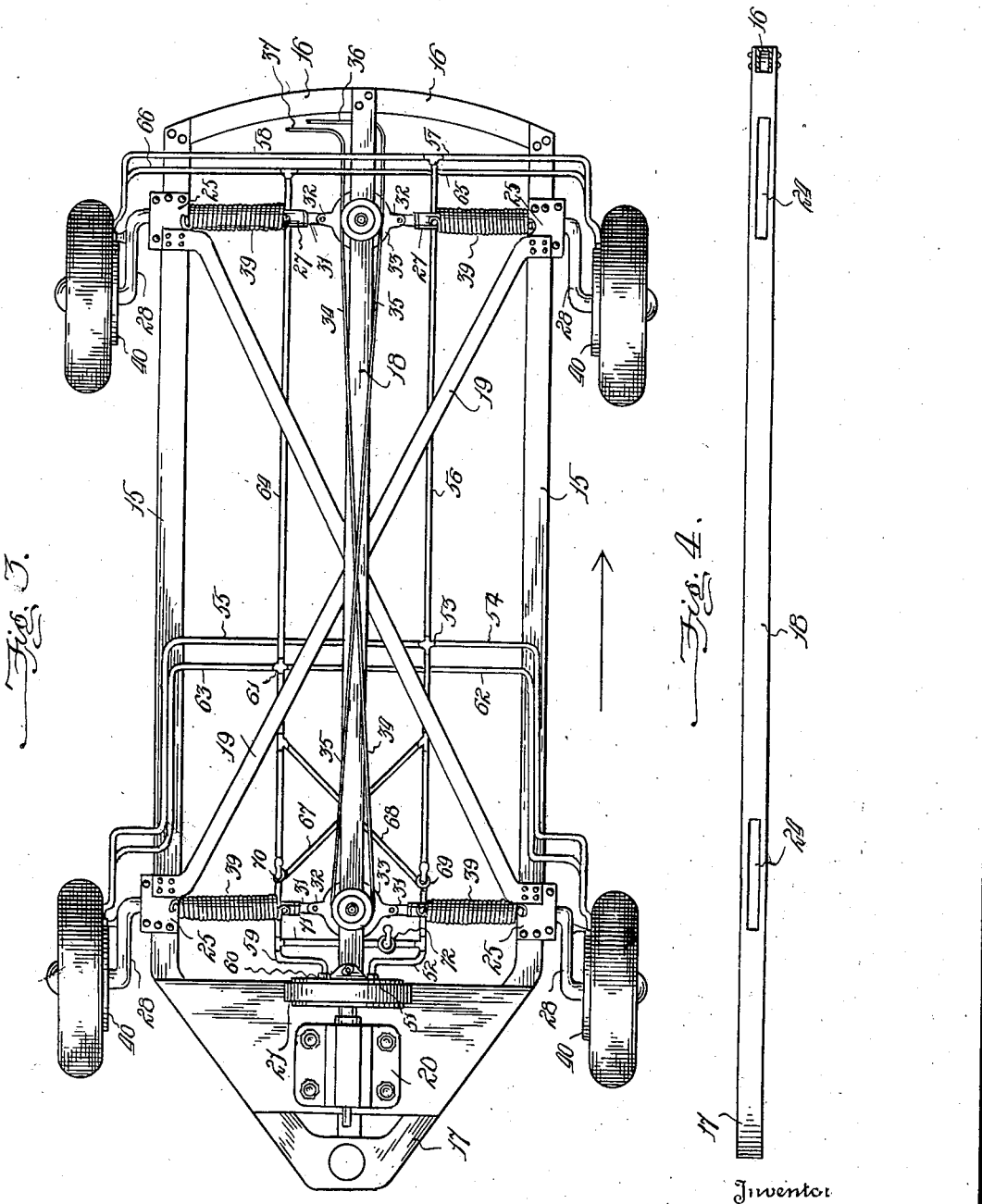

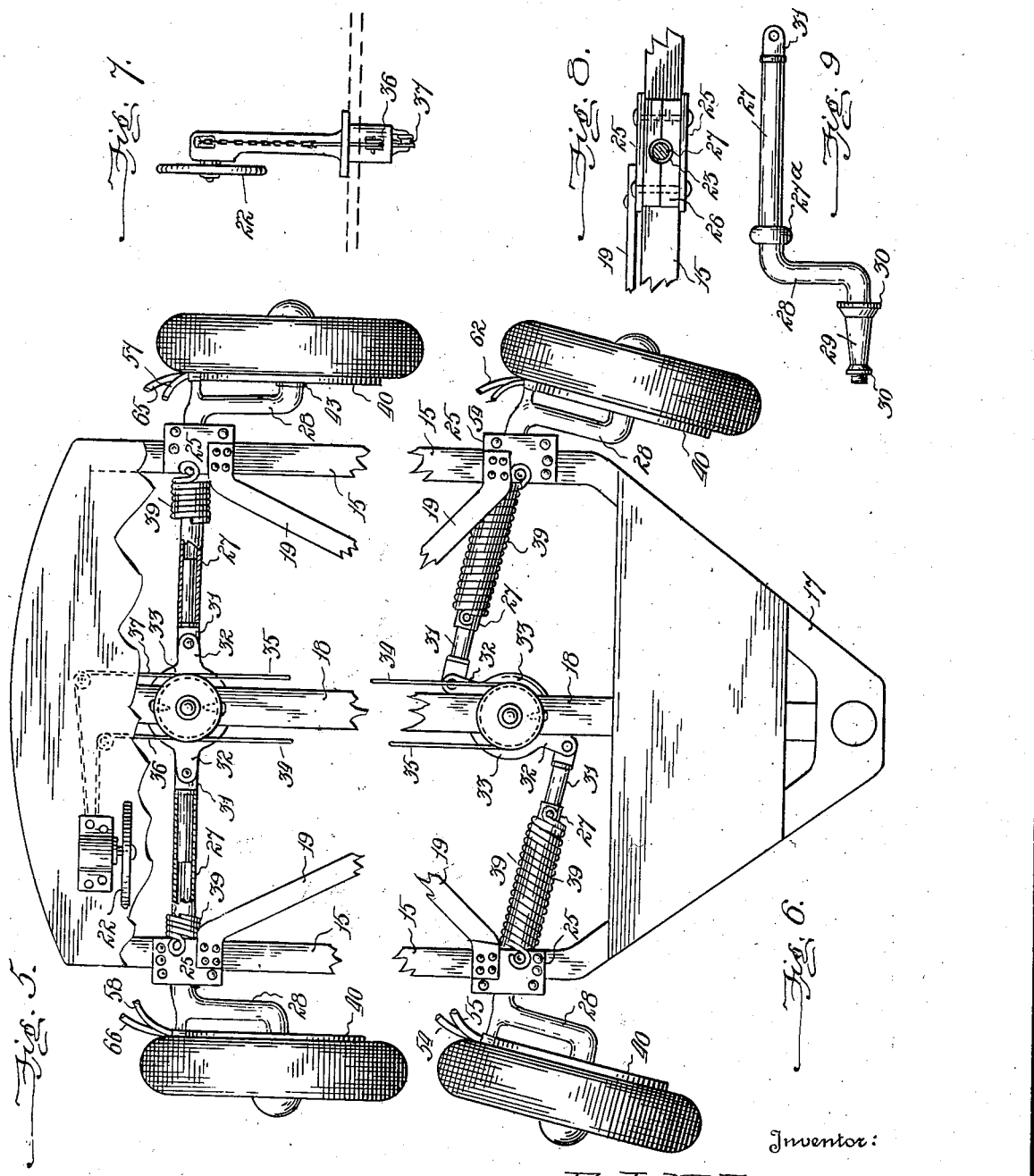

Patented May 4, 1943

2,318,245

UNITED STATES PATENT OFFICE 2,318,245

DRIVING AND STEERING MECHANISM FOR AUTOMOBILES

Edwin J. McFarland, Vulcan, Alberta, Canada

Application September 24, 1940, Serial No. 358,153

7 Claims. (Cl. 280—91)

My invention relates to certain improvements in automobiles or motor vehicles of that special type in which the driving power is applied to the four ground wheels by rotors in association therewith and which latter receive the required fluid pressure from a source of supply under control of the operator.

The principal object I have in view is to simplify the construction of an automobile of this general character, as well as increase its sturdiness and effective operation, by a particular construction and arrangement of the connections between the axles of the ground wheels and chassis to include resilient springs that will relieve the body of the vehicle of shocks and jars and thereby insure ease and comfort of the occupants of the vehicle in riding over uneven roadways.

A further object of my invention is to provide a steering mechanism which contemplates shifting the ground wheels simultaneously to the required degree by movement of the axles through the medium of connections under control of the operator—braking being effected in this instance by controlling the application of the fluid pressure to the driving rotors on the wheels, and the speed of the vehicle controlled in like manner, thus dispensing with the employment of differential and transmission gears.

With these principal objects in view my invention contemplates a particular construction and arrangement of mechanical elements in the construction of an automobile or motor vehicle, all as hereinafter fully described and more specifically set forth in the appended claims.

In the drawings:

Figure 1 is a plan view illustrating the construction of chassis and arrangement in respect to the axles to which the ground wheels and driving rotors are connected.

Fig. 2 is a side elevation of the chassis, the ground wheels and bearing boxes for the axles being omitted.

Fig. 3 is a plan view of the chassis, showing the pipe connections for supplying fluid pressure to the rotors and the springs for imparting resiliency.

Fig. 4 is a side view of the center beam of the chassis.

Figs. 5 and 6 are enlarged plan views of the front and rear ends of the chassis and supporting means therefor.

Fig. 7 is a detail side elevation of the steering post and steering wheel.

Fig. 8 is a detail view of one of the bearing boxes for the supporting axles.

Fig. 9 is a detail view of one of the axles.

Fig. 10 is a side elevation of a part of the steering mechanism.

Fig. 11 is a view illustrating the manner of connecting the rotors to the ground wheels and axles.

Fig. 12 is a side elevation thereof, and

Fig. 13 shows a modification of the driving mechanism.

In carrying out my invention the frame forming the chassis is made up of side bars 15, 15 connected together at their ends by crosspieces 16 and 17, with a longitudinal center bar 18 and diagonal braces 19 to complete the framework, the end pieces being shaped to receive the body (not shown), and although in this instance I have shown the engine 20 and compressor 21—both of conventional types—as located at the rear end 17 of the chassis they may be located at the front, indicated in Fig. 5 by the steering wheel 22. The frame of this chassis, with the exception of the braces, is preferably constructed of channel bars, and to support the axles and certain elements of the steering mechanism the channel bars at the sides and center of the chassis are provided with transverse openings through the same, the openings, 23, in the side bars being round and slightly larger than the diameter of the axles to provide for lateral and vertical movement thereof, while the openings, 24, through the center bar are elongated to receive an element of the steering mechanism hereinafter described.

For the purpose of journaling the axles to the chassis plates 25, 25 are bolted to the upper and lower sides of the channel bars 15 on a vertical line with the aforementioned openings 23, said plates projecting beyond the channel bars to receive two-part bearing boxes 26 between them (Fig. 8), and each axle, 27, is provided with a rounded bearing collar 27a to permit of a shifting movement of the axle in steering the vehicle. In this instance the axle is of a particular construction to cooperate with torsion springs for resiliently supporting the chassis and body of the vehicle, and for this purpose the outer end of the axle is in the form of an elbow or crank 28 terminating in a spindle 29 having the usual cone bearings 30, 30. To compensate for coordinating lateral movement of the inner and outer ends of the axle when the elbow and wheel are shifted in turning the vehicle, said inner end is provided with a coupling 31 slidable in the end thereof and connected to arms 32 projecting from opposite sides of a turnable disk 33 forming part of the steering mechanism. It will be noted that by this arrangement turning of the disk 33 will shift the outer ends of the axles connected thereto, as well as the wheels, to thereby guide the movement of the vehicle, and to effect this operation in respect to the axles at both ends of the vehicle the disks are connected by cables 34 and 35—crossed from one disk to the other—with the disk at the forward end of the vehicle connected by steering cables 36 and 37 to the steering-wheel 22, as shown in Fig. 5 of the drawings. The particular construction of the axles, with the elbows at the outer ends thereof beyond the chassis, also provides for vertical movement of the chassis supported by the wheels, and to limit this movement, as well as provide for preventing shocks and jars from being imparted to the chassis and body, torsion springs are employed, each spring, 39, encircling the body portion of the axle and firmly connected at its opposite ends to the inner end of the axle and frame of the chassis, respectively. As will be noted by reference to Figs. 5 and 6 the convolutions of the torsion springs extend in that direction whereby downward movement of the chassis will increase the torsibility of the spring, and consequently the strength of the spring will depend upon the weight of the vehicle body and load it is designed to carry; that is to say, normally the bent ends or elbows of the axles will be on substantially a horizontal plane in supporting the body of the vehicle and load, and in riding over an uneven roadway the shocks imparted to the wheels will be absorbed by the torsion springs. The bent end of each axle extends rearwardly, for efficiency in operation, and the coupling by which the axle is connected to the arm of the steering disk forms the support for the inner end of the axle on which it may turn. It will be understood that although the resiliency between the axle and chassis is shown in the drawings as being accomplished by a torsion spring encircling the body of the axle, I contemplate the employment of any other type of spring and connections between the axle and chassis that will effect the same result.

For the driving power of the automobile I employ rotors 40 fastened to the inner side of the wheels and receiving fluid pressure from the compressor 21 by way of supply and return pipes connected to said rotors. The rotors may be of any approved type, and consequently illustration and detail description of the same is deemed unnecessary; it being understood, however, that it is desirable to use that type of rotor (Fig. 12) in which the direction of rotation may be changed by introducing the fluid pressure into either of the ports to which pipes 55 and 63, hereinafter specifically referred to, are connected for driving the vehicle forward or backward. For the fluid pressure to operate the rotors I may employ compressed air but prefer oil, in each instance the flow being returned to the compressor for continuous use, and to prevent leakage from the rotor attached to the ground wheel packings or gaskets 43 and 44 are located between the hub 45 of the wheel and stationary housing of the rotor at the opposite sides of the latter, as shown in Fig. 11—the rotary piston, 46, being secured to the hub in any suitable manner. To support the housing of the rotor stationary in relation to the drive wheel of the automobile the upper end of said housing is provided with spaced apart lugs 47, 48, with the inner surfaces beveled in opposite directions (Fig. 12) to receive a wedge-shape projection 49 extending from the angle of the elbow 28, and to facilitate disconnecting the pipes from the inlet and exhaust ports of the rotor gland nuts 50 connect the pipes to said ports.

The system of pipe connections between the compressor and rotors is illustrated in Fig. 3, from which is will be seen that from one of the ports, 51, of the compressor, pipe 52 extends to a four-way coupling 53 from the opposite sides of which extend pipes 54 and 55 to the rotors on the rear wheels of the vehicle, while pipe 56—a continuation of pipe 52—extends to pipes 57 and 58 at the front end of the vehicle for connection with the rotors on the front wheels. In like manner pipe 59 extends from the other or inlet port, 60, of the compressor, to a four-way coupling 61 from which extend pipes 62 and 63 to the rotors on the rear wheels, with an extension 64 to pipes 65 and 66 connected to the rotors on the front wheels. For the reason that port 51 is the outlet from the compressor, to supply the fluid pressure to the rotors on the vehicle wheels, and port 60 is the intake by which the fluid pressure is returned to the compressor, the pipes extending directly from said ports are connected by by-pass pipes 67 and 68 to change the course of the fluid pressure, and to control the direction of flow to the intake and outlet ports of the rotors valves 69 and 70 are at the junction of the by-pass pipes with the main pipes, each valve being a conventional two-way valve to permit flow either directly to the four-way couplings or indirectly by way of the by-pass pipes. The system of piping described is such that in driving the vehicle forward to fluid under pressure from the compressor passes from the outlet port through the valves to pipes 54, 55 onto the pipes 57, 58 and enters that side of the rotors to drive the wheels in that direction, or forward, the fluid under pressure returning from the rotors by way of pipes 65, 66 and 62, 63 to main pipe 59 leading to the inlet port of the compressor—valves 69 and 70 being so disposed as to cut off the flow to the by-pass pipes. Conversely, in backing the vehicle, the valves are turned to direct the flow from the compressor to pipes 62, 63 and 65, 66 by way of by-pass 68 and thus reverse the turning of the rotors—the fluid under pressure returning by way of pipes 57, 58 and 54, 55 to by-pass 67 and main pipe 59. To cut off power to the rotors for stopping the vehicle—without stopping the running of the engine and compressor—a by-pass 71 connects the main pipes 52 and 59 just beyond the compressor, and is provided with a valve 72 normally closed when the vehicle is running and when entirely opened will short the stream of fluid under pressure away from the rotors by returning it directly to the compressor. This valve may be manipulated also for regulating speed of the vehicle by opening and closing the same to a more or less extent to thereby vary the power supplied to the rotors on the driving wheels.

When the engine and compressor are located at the rear end of the vehicle, with the valves for controlling the flow of fluid pressure likewise located, suitable means will be employed for operating the valves from the forward end of the vehicle, but as hereinbefore stated those mechanical parts may be at the forward end of the vehicle with upstanding pipes to locate the valves near the steering wheel for convenient operation by the driver.

The operation of an automobile provided with the improvements herein shown and described is as follows. Before starting the engine which drives the compressor the control valve 72 is opened and the valves 69 and 70 turned to direct the flow of fluid pressure to the rotors according to the direction in which the vehicle is to be driven—either by way of the pipes 54, 55 and 57, 58, for forward movement, or pipes 62, 63 and 65, 66, for backward movement—and as the fluid pressure will circulate through the by-pass pipe 71 and not operate the rotors the vehicle will remain stationary until the control valve is manipulated to direct the fluid pressure to the rotors. By gradually closing the control valve the vehicle will be started gradually and the speed increased to maximum by closing said valve entirely. For slowing or stopping the automobile it is necessary only to open the control valve to a more or less extent—the opening of the valve to the fullest extent causing a braking of the wheels, the operation being after the manner of pneumatic brakes. It will therefore be obvious that the driving of the automobile in respect to speed, slowing up, and stopping is controlled in the present instance by simply manipulating the control valve, the position of the valves in Fig. 3 of the drawings showing the circuit of the fluid pressure as passing through the rotors and returning to the compressor to drive the vehicle forward. In steering the vehicle the wheels are turned by the operation of the steering wheel connected to the disks having the arms, said disks shifting the axles on the pivots located at the bearing boxes—the disks at the front and rear of the vehicle being connected by cables for simultaneously turning the four wheels.

By the particular construction of the axles in connection with the torsion springs an easy motion of the body of the vehicle is obtained for the reason that the elbows at the ends of the axles on which the wheels are journaled permit of up and down movement of the body and chassis retarded by the action of the springs to absorb shocks and jars in the passing of the vehicle over a rough road.

Instead of driving the ground wheels by rotors associated therewith, as hereinbefore described, they may be driven in the usual manner by an internal combustion engine geared thereto, as illustrated in the modification Fig. 13, wherein the numeral 73 designates an enclosed transmission gear of any approved type and from which driving shafts extend through the outer ends of the axles to the spindles on which the wheels are journaled, and as the axles having elbows at their outer ends are employed also in this instance each shaft is made in sections with a slidable joint to compensate for the rocking movement of the elbow. Accordingly, each driving shaft includes an intermediate extensible section 74 connected at its ends by universal joints 75, 75 to an outer section 76 carrying the spindle and an inner section 77 extending into the transmission casing. As the construction of axles, steering mechanism, and shock absorbing torsion springs employed are of the construction hereinbefore described, like reference numerals are used in designating the parts thereof.

I claim:

1. In the construction of an automobile, the combination with the chassis having side bars, of separate axles for supporting the chassis from the ground wheels, said axles being connected by universal joints to the side bars of the chassis and each having a rearwardly extending crank arm at its outer end on which the wheel is journaled for swinging movement of the crank arm, and a torsion spring encircling the body portion of the axle and connected at its ends to the axle and chassis for yieldingly supporting the chassis from the ground wheels; together with means connected to the inner ends of the axles for shifting movement thereof in steering the automobile.

2. In the construction of an automobile, the combination with the chassis having side bars, of separate axles for supporting the chassis from the ground wheels, said axles being connected by universal joints to the side bars of the chassis and each having a rearwardly extending crank arm at its outer end with a spindle at the outer end of the crank arm on which the wheel is journaled, and torsion springs encircling the axles and connected at their ends to the axle and chassis for yieldingly supporting the chassis from the ground wheels; together with couplings slidably connected to the inner ends of the axles, and means connected to the couplings for shifting movement of the axles in steering the automobile.

3. In the construction of an automobile, the combination with the chassis having side bars, of separate axles for supporting the chassis from the ground wheels, said axles being connected by universal joints to the side bars of the chassis and each having a rearwardly extending crank arm at its outer end with a spindle at the outer end of the crank arm on which the wheel is journaled, and torsion springs encircling the axles and connected at their ends to the axle and chassis for yieldingly supporting the chassis from the ground wheels; together with couplings slidably connected to the inner ends of the axles, disks turnable in the chassis, and means connecting the couplings to the disks for shifting movement of the axles on turning movement of the disks to effect steering of the automobile.

4. In the construction of an automobile, the combination with the chassis having side bars, of separate axles mounted in the side bars for supporting the chassis from the ground wheels, said axles each having a rearwardly extending crank arm with a spindle at the outer end thereof on which the wheel is journaled for swinging movement of the crank arm with respect to the chassis, springs interposed between the chassis and axles for yieldingly supporting the chassis from the ground wheels, turnable disks mounted at the forward and rear ends of the chassis and connected together for simultaneous movement, means for slidably connecting the inner ends of the axles to the disks for shifting the axles in steering the automobile, and means for turning one of the disks.

5. In the construction of an automobile, the combination with the chassis having side bars, of separate axles mounted in the side bars for supporting the chassis from the ground wheels, said axles each having a rearwardly extending crank arm at its outer end with a spindle at the outer end of the crank arm on which the wheel is journaled for swinging movement of the crank arm with respect to the chassis, torsion springs encircling the axles and connected at their ends to the axles and chassis for yieldingly supporting the latter from the ground wheels, turnable disks mounted in the chassis at the front and rear ends thereof, said disks being connected together for movement in unison, slidable couplings between the disks and inner ends of the axles for shifting the axles by means of the disks, and means for turning one of the disks.

6. In the construction of an automobile, the combination with the chassis having side bars, of separate axles mounted in the side bars for supporting the chassis from the ground wheels, said axles each having a rearwardly extending crank arm at its outer end with a spindle at the outer end of the crank arm on which the wheel is journaled for swinging movement of the crank arm with respect to the chassis, and torsion springs encircling the axles and connected at their ends to the axles and side bars of the chassis for yieldingly supporting the chassis on the axles; in association with disks mounted in the chassis and having arms projecting therefrom in opposite directions, couplings pivotally connected to the arms and slidably connected to the inner ends of the axles for coordinating movement of the inner and outer ends of the axles in shifting the wheels for steering the automobile, and means for turning the disks.

7. In the construction of an automobile, the combination with a chassis in the form of a frame made up of bars to include side pieces and a center longitudinal beam intermediate the side pieces, of plates secured to the upper and lower sides of the side pieces to extend laterally beyond the outer sides thereof, and two-part axle bearings secured within the projecting ends of the plates; together with separate axles for the ground wheels supported in the aforementioned bearings and each having a rearwardly extending crank arm with a laterally projecting spindle at the outer end thereof on which the wheel is journaled, torsion springs encircling the inner portions of the axles and connected at their ends to the axle and adjoining side piece of the chassis for yieldingly and resiliently supporting the chassis on the axles, and means for imparting lateral movement of the inner ends of the axles in guiding the automobile including turnable disks mounted on the longitudinal beam and having oppositely projecting arms connected to the inner ends of the axles, and means for turning the disks in unison.

EDWIN J. McFARLAND.